May 17, 1966

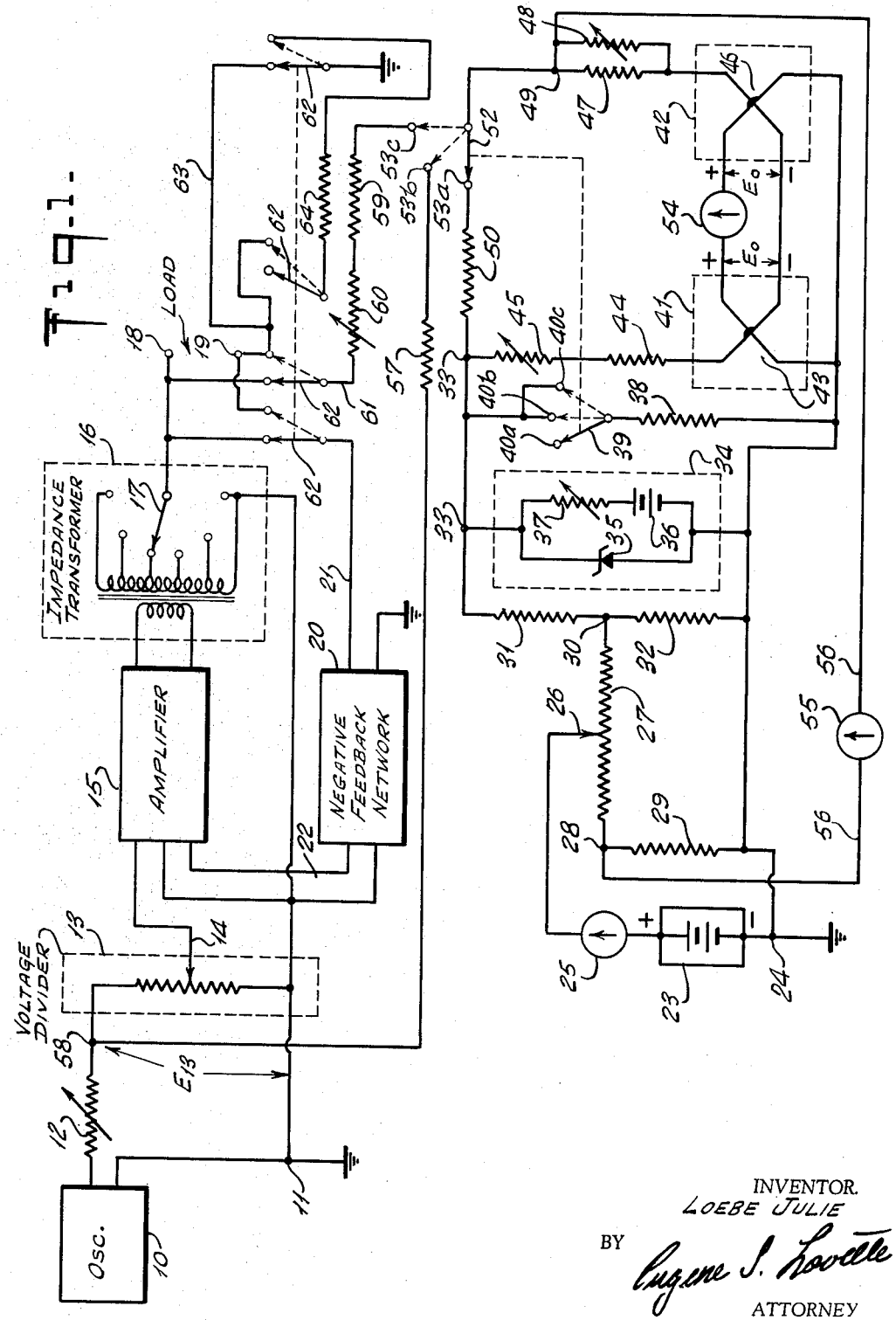

L. JULIE 3,252,090

PRIMARY STANDARD VOLTAGE AND CURRENT
SOURCE AND METHOD FOR USE THEREOF

Filed Dec. 21, 1962

INVENTOR.
LOEBE JULIE
BY Eugene S. Lovette
ATTORNEY

May 17, 1966   L. JULIE   3,252,090
PRIMARY STANDARD VOLTAGE AND CURRENT
SOURCE AND METHOD FOR USE THEREOF
Filed Dec. 21, 1962   3 Sheets-Sheet 3
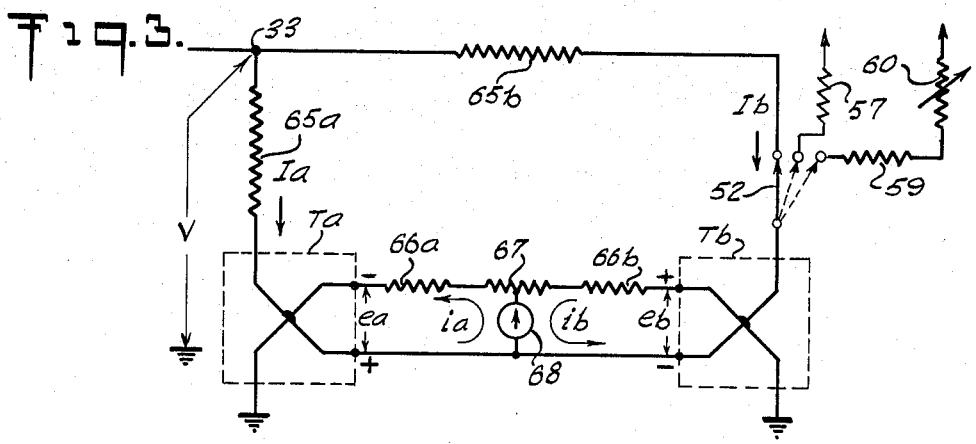
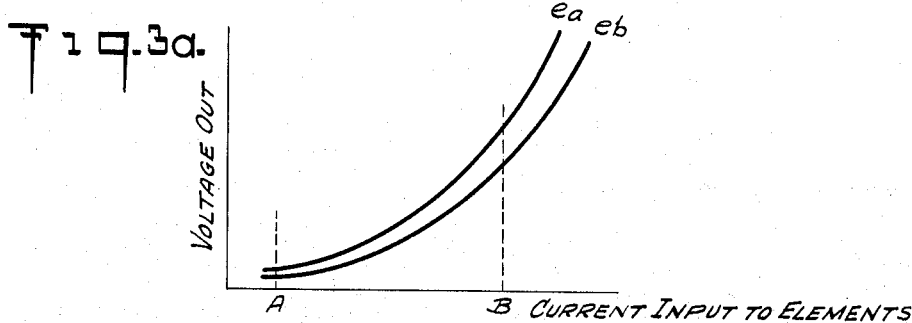
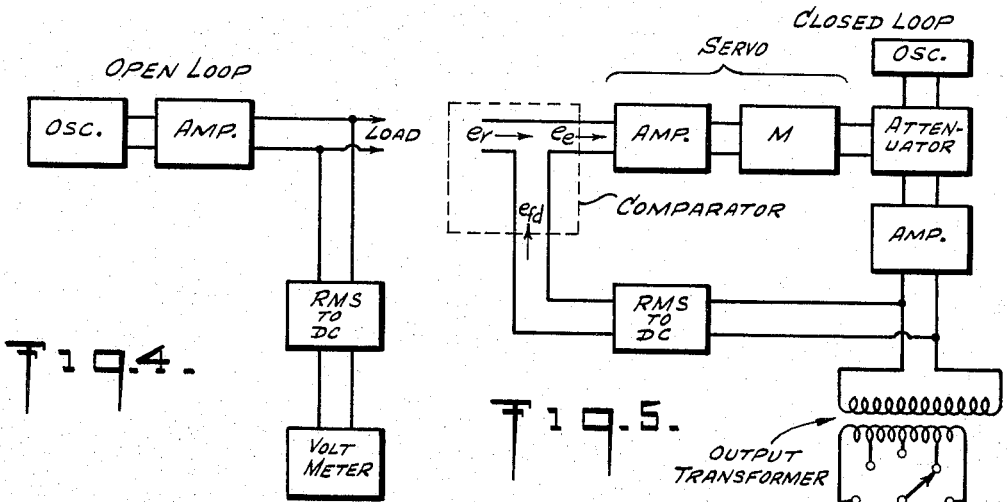
INVENTOR.
LOEBE JULIE
BY
Eugene S. Lovitz
ATTORNEY _United States Patent Office_  3,252,090
Patented May 17, 1966

3,252,090
PRIMARY STANDARD VOLTAGE AND CURRENT SOURCE AND METHOD FOR USE THEREOF
Loebe Julie, Bronx, N.Y., assignor to Julie Research Laboratories, Inc., New York, N.Y., a corporation of New York
Filed Dec. 21, 1962, Ser. No. 246,465
15 Claims. (Cl. 324—98)

The present invention relates to methods and means for providing an extremely accurate primary standard A.C. voltage and/or current source.

Techniques used heretofore for providing standard A.C. voltages and/or currents are basically the "open loop" system or the "closed loop" system. FIG. 4 depicts an "open loop" system, wherein the output signal of an oscillator is fed to a high power amplifier. The output of the amplifier feeds the load. The oscillator-amplifier is continuously monitored to maintain a constant and accurate output by means of a precision voltmeter, such as a digital voltmeter. An A.C. to D.C. conversion is provided by an R.M.S. to D.C. converter. In spite of the high accuracies of the apparatus involved, the foregoing "open loop" system is subject to limitations. For example, it requires continuous monitoring of the output signal voltage. Precision is further limited by the accuracy of the R.M.S. to D.C. converter, which is rarely better than ±0.1% to which must be added the errors in the digital voltmeter and other instabilities.

FIG. 5 depicts a "closed loop" circuit for providing a precision A.C. standard. In this instance, an electromechanical servo system is designed to regulate an attenuator which is fed by the output of the signal generator and which in turn feeds into the input of the high quality power amplifier. The servo amplifier derives its error signal $e_e$ from a comparator circuit which continuously measures the difference between a convenient reference $e_r$, such as a zener supply, and a sampled output $e_{fd}$ from the amplifier. An A.C. conversion is effected by an R.M.S. to D.C. converter. The output of the A.C. standard source appears at the output side of its transformer. This method is not all together suitable for very high accuracy operations and has many limitations. For example, the R.M.S. to D.C. converter introduces accuracy limitations, and as seen from FIG. 5, the converter is always in the feedback loop. This is of a particular importance for commercial instruments when the converter is waveform sensitive or frequency sensitive. Secondly, the relatively sluggish dynamic response of even the best servo system introduces further limitations, particularly, when relatively rapid regulation is required. The limitations imposed upon the "closed loop" system by the dynamics of the servo system practically eliminates the possibility of sensing beyond the output transformer, consequently, this deteriorates the frequency response characteristics of the A.C. source, particularly, at extreme ratios required for very low or very high voltages or currents.

It is the principal object of the invention to provide method and means relating to an A.C. standard source capable of high voltage and current accuracies and wherein said A.C. source incorporates means for instant calibration against a certified National Bureau of Standards reference so as to maintain such high levels of accuracy. As a further advantage, the circuitry of the invention is designed wherein the R.M.S. to D.C. conversions are performed only during calibration operations and said conversions are not a part of the A.C. standard signal circuit.

It is a further object to provide method and means relating to an A.C. standard source wherein the oscillator circuit is operated at a selected output level regardless of the load voltage or load current so as to enhance long term and thermal stability of such oscillator circuit.

It is a further object of the invention to provide method and means for monitoring the output of a signal generator circuit at the oscillator output stage or at a later stage, such as the terminal output stage after the impedance transformer, so as to effect calibration at the oscillator stage and also to ascertain accurately whether the entire system as an A.C. reference source is functioning at the proper level of accuracy.

It is a further object of the invention to provide method and means for normalizing a thermo-couple junction element against a second of such elements so as to eliminate second order inaccuracies caused by the fact that the two elements produce individual output responses which are not identical in magnitude for identical input currents sensed by the elements.

It is a further object of the invention to monitor a normalized thermo-couple junction element as contemplated herein against resistive changes due to ageing.

Further objects and advantages will become apparent from the following description of the invention taken in conjunction with the figures, in which:

FIG. 1 is a schematic illustration of an A.C. standard source in accordance with the principles of the invention;

FIG. 3 is a schematic illustration for balancing thermocouple elements in accordance with the principles of the invention;

FIG. 3a is a curve employed in the description of the improvements covered by FIG. 3; and FIGS. 4 and 5 depict prior art circuitry in blocked diagram to assist in the explanation of the instant invention.

Figure 1A:
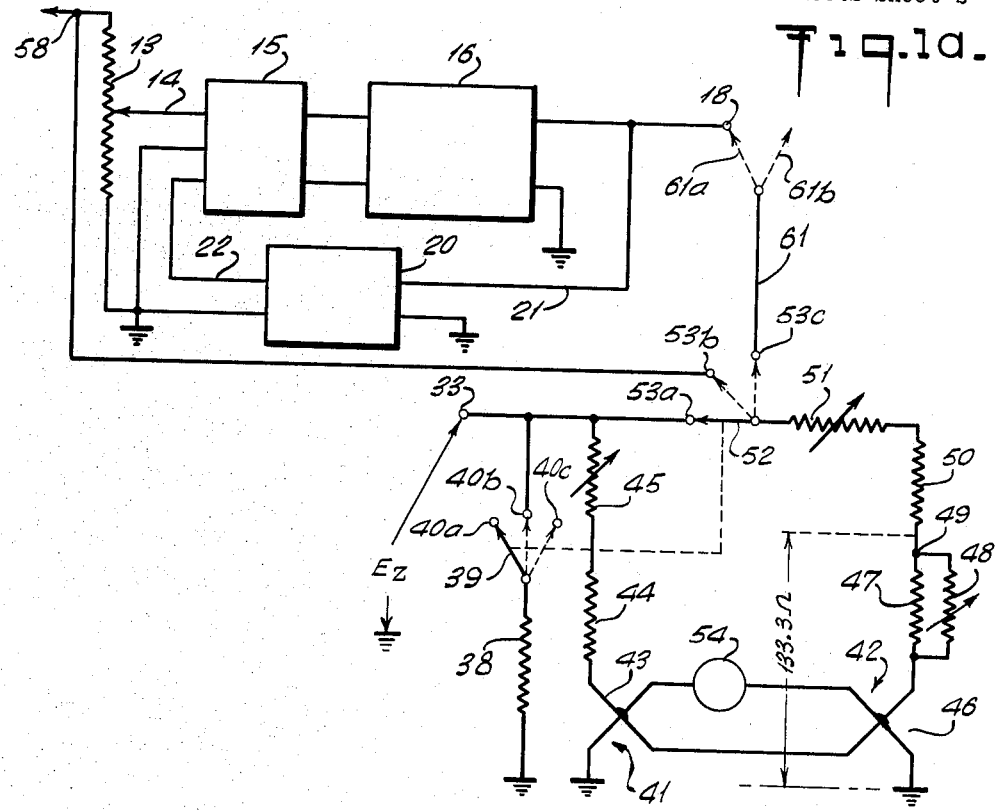
FIGURE 1a is a schematic illustration embodying a modification of a portion of the circuit shown in FIG. 1.

The A.C. signal or voltage producing circuit of the A.C. standard source is at the upper portion of FIG. 1; whereas, the signal calibrating and monitoring circuit is at the bottom portion thereof. A stable oscillator 10 provides the desired A.C. signal which will be calibrated and monitored in accordance with the invention. One output side of oscillator 10 is grounded at 11. The other output side of oscillator 10 is series connected to an adjustable trimming resistor 12. The output end of resistor 12 connects to the top end of an output voltage divider 13. The output of voltage divider 13 is taken from its adjustable arm 14 and fed into the input of a stable amplifier 15. The output of amplifier 15 is coupled to the load (not shown) by way of an appropriately tapped impedance matching transformer 16. The desired transformer matching impedance is selected by means of a switch 17. The output of the system appears at terminals 18 and 19, and the latter is shown grounded. A portion of the output voltage is sampled by a negative feedback network 20 via line 21. Feedback network 20 applies to regulating voltage signal of proper phase via line 22 to the input side of amplifier 15; whereby, the total loop gain of amplifier 15 is held closely to its nominal value.

Reference is now made to the lower portion of FIG. 1 for a description of the D.C. calibration and monitoring portion of the circuit. The circuit includes a primary D.C. voltage supply 23, such as a battery cell certified by the National Bureau of Standards. Voltage provided by cell 23 is certified to a 1 part per million accuracy and stability. The negative side of cell 23 is grounded at 24. Cell 23 is in series with a current sensitive meter 25. The positive side of cell 23 is connected to an arm 26 of a rheostat 27. One end of rheostat 27 is connected at junction 28 to a resistor 29. The other end of resistor 29 is grounded. The second end of rheostat 27 is connected to a junction 30. A pair of resistors 31, 32 form a common connection at junction 30. The bottom end of resistor 32 is grounded. The top end of resistor 31 is connected to a junction 33.

A constant D.C. voltage supply 34 is applied between junction 33 and the negative side of cell 23. Source 34 is a highly regulated zener supply made up of a zener diode 35 bridged by a battery 36 in series with an adjustable resistor 37. The zener diode has a substantially constant breakdown voltage which varies only slightly as a function of current. Resistor 37 serves to regulate current through zener diode 35 in order to provide a fine adjustment of zener supply output voltage $E_z$ of preset values as indicated by nulling meter 25. A resistor 38 is arranged for connection in parallel across zener supply 34 by means of a multiposition switch 39 having three contact terminals 40a, 40b, 40c. Zener supply 34 is designed to serve as an extremely accurate and stable secondary reference source for supplying a D.C. potential or preselected value of indicated polarity at junction 33 to calibrate and monitor the amplitude of the A.C. standard supply provided by the foregoing described oscillator circuit. Accordingly, zener supply 34 is accurately standardized against primary cell 23.

Figure 2:
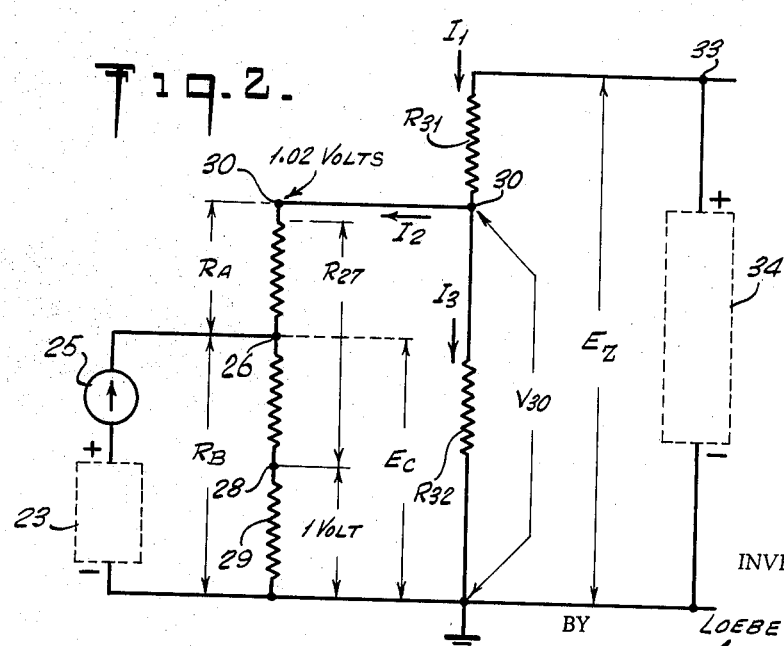
FIG. 2 is an enlarged schematic illustration of a portion of the circuit shown in FIG. 1.

For reasons that will become evident in the description immediately following, the resistance parameters of the foregoing zener standardizing network are selected to provide highly accurate and stable D.C. voltages of preselected potentials at junctions 28, 30 and 33. Reference is made to FIG. 2 which is an enlarged schematic view of this portion of the network for the following analysis. The network is normalized to provide highly accurate and stable D.C. potentials of 1 volt at junction 28 with respect to ground, 1.02 volts at junction 30 with respect to ground, and 10 volts at junction 33 with respect to ground. When zener supply 34 is being standardized, switch 39 is positioned to connect to its terminal 40a, whereby resistor 38 is disconnected from the circuit. Examples of network parameters achieving the foregoing operating conditions are as follows:

$R_{31}$, the resistance of 31 is 8980 ohms;
$R_{32}$, the resistance of 32 is 1030.3 ohms;
$R_{29}$, the resistance of 29 is 100K ohms;
$R_{27}$, the total resistance of rheostat 27, i.e. from junction 28 to 30 is 2K ohms; and
A certified standard cell providing voltage $E_c$ of 1.006 volts.

When meter 25 nulls, the potential from the point of contact of tap 26 along rheostat 27 to ground is established as an absolute constant of 1.006 volts. This voltage is shown across resistance $R_B$ in FIG. 2. A simple network calculation establishes that with zero current through cell 23 (meter 25 at null), the combination of rheostat 27 plus $R_{29}$ (102K ohms) is in parallel across $R_{32}$ to establish a resultant resistance of 1020 ohms from junction 30 to ground. The 1020 ohms is in series with $R_{31}$ of 8980 ohms to provide a total of 10,000 ohms from junction 33 to ground across which a 10 volt zener supply $E_z$ is applied. This defines the current $I_1$ through resistance 31 as 1 milliamp. Further network calculations will establish a potential of 1.02 volts at junction 30 with respect to ground. Since this potential is also across 2K and 100K series resistors, a 1 volt potential with respect to ground is established at junction 28. Additional network calculations will establish a branch current $I_2$ of .01 milliamps and a branch current $I_3$ of .99 milliamp.

The accuracy and stability of the D.C. reference network is based upon the accuracy and stability characteristics of the absolute standard $E_c$ and resistance ratios as seen from FIG. 2 and the following:

$$E_c = I_2 \times R_B = 1.006 \text{ volts} \quad (1)$$

where $I_2$ is the branch current flowing into the top portion $R_A$ of rheostat resistance and where $R_B$ is the aggregate resistance of the bottom portion of the rheostat resistor plus 100K ohms. Hence, the values of $R_A$ and $R_B$ may be regulated by the position of rheostat arm 26. $V_{28}$, the drop across the 100K resistor $R_{29}$ in terms of the standard $E_c$ is:

$$V_{28} = I_2 \times R_{29} = E_c \times \left(\frac{R_{29}}{R_B}\right) \quad (2)$$

By selecting the portion of rheostat 27 from junction 26 to junction 28 to equal 600 ohms, a 1 volt potential characterized by a 5 part per million stability and accuracy is established at junction 28. Such accuracy and stability are obtainable since it will be understood that $E_c$ is an absolute standard and, further, it is within the state of the art to provide a resistance ratio decade formed of high production precision resistors of like composition, whereby the value of the resistance ratio is characterized by an accuracy and stability such that the 1 volt potential established at junction 28 is ±.0005%. Similarly, a highly accurate voltage potential of $V_{30}$ equal to 1.02 volts within .0005% is established at junction 30 as noted by the following:

$$V_{30} = I_2(R_A + R_B) = E_c \frac{(R_A + R_B)}{R_B} \quad (3$$

The foregoing provides a $V_{30}$ of ±.0005% because the resistors constituting the ratio $(R_A + R_B)/R_B$ are high production precision resistors of like composition.

The foregoing network and voltage conditions at junctions 28 and 30 obtain when the applied zener reference is exactly 10 volts from junction 33 to ground. This is indicated by a null balance at meter 25. In other words, when source 34 is regulated to provide an $E_z$ of 10 volts, meter 25 balances for the illustrated network. This establishes the 1.02 volts at junction 30. The remainder of the 10 volt drop (8.98 volts) is across resistor 31. Hence, the zener voltage $E_z$ is compared and established against an absolute standard by another highly accurate resistance ratio:

$$E_z = 10 \text{ volts} = 1.02 \text{ volts at junction } 30 + (I_2 + I_3)R_{31}$$
$$= 1.02 + \left[\frac{E_c}{R_B} + \frac{1.02}{R_{32}}\right]R_{31} = 1.02 + 1.02\frac{R_{31}}{R_{32}} + E_c\frac{R_{31}}{R_B} \quad (4)$$

The established 10 volt secondary reference from zener supply 34 now may be employed to monitor the amplitude of the A.C. oscillator circuit. Although not mentioned hereinbefore, it will be noted that the D.C. calibrating circuit includes a pair of current sensitive thermo-couple junction elements 41, 42. The heater inputs of elements 41, 42 are connected in respective first and second resistance circuits. The pair of circuits were connected in parallel across junction 33 to ground while the zener supply 34 was being standardized. Elements 41, 42 are square law current responsive thermo-couples preferably of like compensation characteristics, wherein each element produces an output voltage $E_0$ which is a function of the square of the R.M.S. current sensed by the element heater. The resistance circuit including element 41 involves its heater 43 connected on one side to ground and on the other side to a fixed resistor 44 in series with an adjustable resistor 45 to junction 33. The resistance circuit including element 42 involves its heater 46 connected on one side to ground and on the other side to a parallel combination of resistors 47, 48 which in turn are connected at junction 49 to a fixed and precision resistor 50. This latter circuit also has a multiposition switch 52 having three terminals 53a, b, c. Switch 52 is arranged to connect its circuit to junction 33 when its switch arm 52 makes contact with its terminal 53a. For convenience, it will be assumed that switch arms 39, 52 are ganged to effect coincident connections of terminals 40a and 53a; 40b and 53b; and 40c and 53c, respectively.

As depicted in FIG. 1, the thermo-couple outputs of both elements 41, 42 are connected in series opposition through a current sensitive null detector 54. Consequently, with ganged switches 39, 52 connected to respective terminals 40a, 53a as illustrated, the heaters of elements 41, 42 together with the resistors connected thereto define two individual circuits each in parallel across zener supply 34. Adjustable resistor 45 is now regulated until meter 54 indicates a null. When this situation obtains, the input currents and the output voltages sustained by both elements 41, 42 are exactly equal. The potential at junction 49 is compared to the reference voltage established at junction 28 by connecting said junctions through a current sensitive null meter 55 via connecting lead 56.

If the aggregate series resistances of 44, 45 and heater 43 is chosen to be 1333.3 ohms, and similarly, if the aggregate series resistances of resistance 50, the parallel combination of 47, 48 plus heater resistance 46 is also selected to be 1333.3 ohms, then each element heater draws 7.5 milliamps for the condition of 10 volts from junction 33 to ground. The nominal resistance for the element heaters are 133.3 ohms for a 7.5 milliamp current flow. Furthermore, the circuit parameters in series with element 42 are selected so that precision resistance 50 is fixed at a value of 1200 ohms and the series resistance from junction 49 to ground, i.e. the parallel combination of 47 and 48 in series with element heater 46 is 133.3 ohms. This provides a total series resistance of 1333.3 ohms from junction 33 to ground for the input circuit of element 42 to produce 7.5 milliamps through element heater 46 for a 10 volt potential applied to junction 33. A calculation will also show that the foregoing establishes a potential drop of 1 volt from junction 49 to ground. The remaining 9 volts appear across resistor 50. One volt at junction 49 to ground is retained by comparing the potential at junction 49 with the 1 volt reference at junction 28. Junction 49 holds the 1 volt potential as long as meter 55 is at a null. If for any reason the potential at junction 49 drifts from 1 volt, resistor 48 is adjusted to return same to such potential as indicated by meter null at 55. A drift may be caused by ageing of the thermo-couple element 42. Consequently, it is noted that the foregoing circuit also provides satisfactory compensation on the normalizing circuit against causes resulting in drift such as ageing of the normalized thermocouple 42.

After calibrating the thermo-couple elements 41, 42, the system is ready for calibrating and monitoring the output amplitude of oscillator 10 or transformer 16. For the former, ganged switches 39, 52 are moved to connect with terminals 40b, 53b, respectively. This connects heater 46 of element 42 through the parallel resistors 47, 48 to a precision resistor 57, the other end of which connects to junction 58, i.e. the input to voltage divider 13. In addition, resistor 38 is now connected across zener supply 34 by means of switch 39 and terminal 40b. Resistor 38 is selected to have a nominal resistance substantially equal to the series combination for the circuit comprising the resistance of heater 46 plus the resistances in series therewith, i.e. 1333.3 ohms. This loads the zener supply 34 to compensate for removal of the circuit of element 42 therefrom, whereby the current through zener diode 35 remains essentially the same. The resistance of resistor 38 need not be exactly equal to the 1333.3 ohms inasmuch as small current variations introduced into the zener diode are of negligible effect.

The resistance 57 is a multiplier resistor. It has a selected value so that the aggregate series resistance of the circuit comprising resistor 57 plus the parallel combination of resistors 47, 48 plus the resistance of element heater 46 is of such proportion to 1333.3 ohms that the previously indicated null by meter 54 is again indicated when the voltage established across divider 13, junction 58 to ground, is the desired proportion of zener voltage $E_Z$. In other words, after normalizing element 42 by nulling meter 54, meter 54 will indicate a null condition if the $E/R$ ratio with respect to the circuit of element 46 remains constant. When standardizing voltage divider 13, heater 46 of element 42 and the parallel combination of resistors 47, 48 and resistor 57 in series therewith are now in the A.C. circuit, i.e. across divider 13. Consequently, it will be noted that the divider voltage $E_{13}$ is readily standardized from the following relationship:

$$\frac{E_{13}}{E_Z} = \frac{R_{57}'}{R_{50}'} \text{ when meter 54 nulls, } \therefore E_{13} = E_Z \frac{R_{57}'}{R_{50}'}$$

(5)

where:

$E_{13}$ is desired voltage across divider 13, i.e. from junction 58 to ground;

$R_{57}'$ is the aggregate series resistance of resistor 57 plus the parallel combination of resistors 47, 48 plus heater 46 of element 42, i.e. junction 58 through element 42 to ground;

$R_{50}'$ is the aggregate series resistance of resistor 50 plus the parallel combination of resistors 47, 48 plus the heater 46 of element 42, i.e. junction 33 through element 42 to ground (1333.3 ohms); and $E_Z$ is the standardized zener supply reference, i.e. 10 volts.

The foregoing relationship is effectively realized to obtain an accurate A.C. divider voltage $E_{13}$ of $\pm.005\%$. Hence, the desired value of $E_{13}$ is actually achieved by the practice of the instant invention by reason of selectively setting the value of the resistance decade comprising resistor 57 to be the proper multiple of resistance 50. For example, if a 50 volt potential is required for $E_{13}$, and if the zener voltage is established at 10 volts, the divider voltage is accurately achieved by dialing the resistance ratio decade constituting resistor 57, whereby the resistance ratio of $R_{57}'$ to $R_{50}'$ equals 5. In order to provide vernier adjustments to the output of oscillator 10 to achieve the desired voltage level, 50 volts in our example, variable resistor 12 may be adjusted until meter 54 nulls.

The output of the A.C. standard system at terminals 18, 19 is monitored by positioning ganged switches 39, 52 to contact respective terminals 40c, 53c. When switch 39 is in position 40c, resistor 38 remains in parallel across zener supply 34 for the reasons stated hereinbefore. When switch 52 is in position 53c, heater 46 of element 42 and parallel resistors 47, 48 are inserted in series with a precision resistor 59 and a variable deviation resistor depicted at 60. Resistor 59 is connected to terminal 18 by line 61 in order that element 42 sample the output load voltage at terminals 18, 19. The foregoing monitors the output of the A.C. standard to verify whether the output network thereof and the feedback circuit are functioning correctly. For example, after oscillator 10 is calibrated for $E_{13}$, the divider arm is "dialed" to provide an input of selected amplitude to amplifier 15 and impedance transformer 16 is set at a selected multiplication factor. Resistor 59 is selected so that the aggregate series resistance of resistors 59, 60, the parallel resistors 47, 48 and heater 46, i.e. the series resistance from junction 18 through heater 46 to element 42 to ground is a predetermined multiple with respect to the aggreate series resistance from junction 33 through resistor 50, resistance 47, 48 and heater 46 of element 42 to ground, such that the currents through these circuits are the same to effect a null (meter 54); and further, the foregoing resistance ratio should equal the ratio of the voltage at terminal 18 to the voltage of zener supply 34. As noted hereinbefore, high accuracies within .005% may be achieved by using a highly accurate resistance ratio decade. In the event the system voltage at terminal 18 is slightly off for nulling meter 54, resistor 60 is adjusted. Resistor 60 may be scaled to read deviation in terms of percentage of voltage or other parameter, whereby the amount of deviation at terminal 18 may be read directly when nulling meter 54 by adjusting resistor 60.

With the system as just described, standardizing and calibrating and monitoring operations are relatively simple and straightforward. Switches 39, 52 are positioned at 40a, 53a, respectively. The zener supply is normalized against $E_c$. Resistor 45 is then adjusted so that the same current flows through the heaters of both elements 41 and 42 whereby meter 54 nulls. Now switches 39, 52 may be positioned to contact respective terminals 40b, 53b in order to calibrate the voltage amplitude at an input of divider 13. Finally, the output amplitude of the system may be checked out or monitored at terminals 18, 19 by positioning switches 39, 52 to terminals 40c, 53c.

The instant invention permits monitoring the A.C. standard at any time during its operation without interference with its operational function and without injecting system inaccuracies therein. If upon monitoring the A.C. standard, a measurement indicates a drift, for example, a drift at the input to voltage divider 13, the signal from generator 10 may be suitably adjusted by resistor 12.

To achieve very accurate results, standard cell 23, zener supply 34 the standardizing network therefor, and the R.M.S. to D.C. thermo-couple elements 41, 42 and circuits thereof are preferably housed in a temperature regulated atmosphere, such as an oven. This precaution also will maintain the value of the cell 23 as certified by the National Bureau of Standards. In use of the invention, it was only necessary to perform the calibration and normalizing of zener supply 34 against standard 23 once every 24 hours, or once every time the zener supply was turned off and on again. After normalizing zener supply 34, thermo-couple elements 41, 42 required normalizing only once every 8 hours. One reason why the system is free of operational difficulties is that the R.M.S. to D.C. conversion does not interfere with the main line signal producing circuit at the upper portion of FIG. 1 since the conversion elements 41, 42 are part of the circuit at the lower portion of FIG. 1.

The invention also can be used as a high accuracy D.C. calibrated source. In such use, energy is taken from the D.C. zener supply 34, i.e. at junction 33 and connected to input terminals of a voltage divider to allow the apparatus to be used as an adjustable D.C. source.

Another extended use of the invention involves employing same as a highly accurate voltage meter for measuring by comparison methods an external A.C. supply. This may be done by applying the output of the external supply under test to a voltage divider, such as 13, and monitoring same against the calibrated thermo-couple element 42 as described hereinbefore. If the external supply under test has a voltage of predicted value for which the thermo-couple element 42 was previously nulled when calibrated, meter 54 will again null when energized by the external supply. If a correction is needed, a deviation resistor may be employed to indicate the amount of error in the external supply.

FIG. 1 also suggests the use of the invention to provide a highly stable A.C. constant current source. The A.C. output of the FIG. 1 circuit contemplates applying the load across terminals 18, 19. Ganged switch 62 is in up position, as illustrated, whereby terminal 19 is ground by connection 63. To provide an A.C. current source, ganged switch 62 is moved to its down position, whereby a known value standard resistor 64 of 10 parts per million accuracy and stability characteristics is inserted between terminal 19 and ground. In addition, the moved ganged switch 62 now connects line 61 to terminal 19, and also applies the feedback signal to network 20 from terminal 19. This new arrangement permits accurate calibration and regulation of the voltage at terminal 19 with respect to ground. One thereby establishes a very accurate voltage drop across resistor 64 to ground. The impedance from terminal 19 to ground now consists of a parallel circuit made up of resistor 64 of known value; the total series resistance (which is known) of the monitoring circuit made up of series elements 60, 59, the combined elements 47, 48 and element heater 46; and the third branch comprising the input resistance of network 20. The latter resistance is determinable. Consequently, one may determine the resultant resistance of the parallel combination and by knowing the drop across same then determine the load current for a null reading at meter 54. The foregoing is capable of serving as an A.C. current source with ±.006% accuracy and stabilities.

FIG. 1a shows a modification in the circuit of element 42. It is noted in this instance switch 52 is moved ahead of the fixed value 1200 ohm resistor 50 and a variable resistor 51 is inserted in the series with switch arm 52 and resistor 50. The operation is substantially the same as that described before. Resistor 51 is a precision rheostat which may be stepped from a first step of zero ohms, to a second step of 133.3 ohms, to a third step of 266.6 ohms . . . to an "n" plus 1 step of "n"×133.3 ohms, and so on, where "n" is the number of the step less one. As noted hereinbefore, so long as meter 55 is at a null, junction 49 is at one volt, the resistance from junction 49 to ground is 133.3 ohms and the heater 46 of element 42 draws 7.5 milliamps. For external monitoring or measuring with switch 52 making contact with its terminal 53c as shown in FIG. 1a, element 42 continues to draw 7.5 milliamps when the stepped rheostat 51 is at zero ohms for a 10 volt potential at junction 33. However, when 7.5 milliamps flows through one of the 133.3 ohm steps of resistor 51, an additional 1 volt drop will appear across same. The foregoing arrangement, therefore, provides a very accurate extension of the range of external monitoring at measuring end of line 61 by using variable resistance 51 to add 1 volt for each turn of its multiple switch. As a matter of fact, fixed resistor 50 and rheostat 51 may be combined in one decade unit, wherein the multiple switch at its lowest value stops at 1200 ohms to provide the resistance for resistor 50 and then steps from 1200 ohms by the individual amounts of 133.3 ohms. This permits monitoring voltages ≥10 volts. As an example, to monitor 10 volts at the end of line 61a or 61b (FIG. 1a), resistor 51 is stepped to zero ohms when element 42 is normalized as previously described. To monitor 14 volts at the end of line 61a or 61b, resistor 51 is stepped to 533.2 ohms. To monitor 20 volts, resistor 51 is stepped to 1333 ohms to provide a 10 volt drop across same to assure a 7.5 milliamp flow through element heater 46 and so on.

The arrangement of FIG. 1a may be used to normalize element 42. During this portion of the operation, resistor 51 is stepped to equal zero ohms to establish 1333.3 ohms from junction 33 through the circuit of heater 46 to ground for the reasons described previously. The same arrangement may be used to monitor $E_{13}$. When the ganged switches 39, 52 are moved to contact respective terminals 40b, 53b in order to calibrate $E_{13}$, resistance 51 remains at a zero ohm step for calibrating voltage $E_{13}$ for 10 volts. $R_{51}$ is stepped up for values $E_{13}$ greater than 10 volts. It will be noted that in the FIG. 1a arrangement, the circuit connection to junction 58 to calibrate $E_{13}$ does not have resistor 57. Consequently, resistor decade 50–51 serves the multiple purpose of standardizing element 42, and calibrating the input $E_{13}$, and the output at terminal 18 or elsewhere. If the value of the voltage $E_{13}$ is to be higher than 10 volts, then resistor 51 is stepped up 1 volt for each volt that $E_{13}$ is greater than 10 volts. Similarly, the same resistor decade 50–51 is employed when switches 49, 52 are positioned to contact its terminals 40c, 53C to measure or calibrate the voltage at the output terminal 18 or any other A.C. source.

A voltage differential balance was employed to null meter 54 between the bucking outputs of elements 41, 42 as illustrated in FIGS. 1 and 1a. In the voltage differential method, a potential applied at junction 33 is inserted across the individual element heaters and the resistors in series therewith to cause current flow through each element heater. This current generates a voltage at the thermo-couple output which is a function of junction heating. Junction heating is a junction of the square of the current flowing through the element heater. Hence, if the R.M.S. current through each element heater is the same, the output voltages will be the same provided the two junctions are identical. In the FIG. 1 embodiment, the first thermo-couple circuit included an adjustable resistor 45 to vary its circuit current in order to balance meter 54. The output voltages are interconnected to buck to indicate the balance, whereby element 42 is normalized against element 41. This technique provides exact accuracies of first order of magnitude. However, it has limitations and errors of second order of magnitude. Such errors may be caused by the fact that although the two elements 41, 42 are preferably of substantially like composition, it could not be expected that these two elements would be absolutely identical. Furthermore, their different ageing characteristics will also inject second order of magnitude errors. The sensing meter is sufficiently sensitive to sense such second order effects.

For two thermo-couples of substantially like composition, their respective output responses will normally follow curves with a progressively greater deviation therebetween for increasing input currents as depicted in FIG. 3a. The differential between the two output voltages is small and of a second order of magnitude. However, such slight errors are troublesome when a high degree of accuracy is demanded of system of operation. Consequently, in response to a first voltage at junction 33, corresponding to input currents of value A, the output voltages of the two elements $e_a$ and $e_b$ differ by a very small amount. However, if the voltage at the junction 33 is changed to provide input currents of B, the two thermo-couples will have to be rebalanced against each other to approach the accuracy previously achieved. Furthermore, in a system where two thermo-couples not even nominally of the same value are interconnected, any balance between them for a particular applied voltage at 33 is of no use when the applied voltage is changed. In this instance, it is necessary to rebalance the two thermo-couples for each different input voltage.

Reference is made to FIG. 3 which shows a current differential system for interconnecting and balancing two thermal couple elements $Ta$, $Tb$ in accordance with the invention. A voltage V is applied across the two thermal couple circuits. The heater of element $Ta$ is in series with a fixed resistor 65a. The heater of $Tb$ is in series with a fixed resistor 65b. The values of the two resistors 65a and 65b are selected so that each thermo-couple draws equal currents $I_a$, $I_b$. This will provide a first order balance.

Element $Ta$ is connected with its output voltage $e_a$ in additive polarity with respect to the second thermo-couple output voltage $e_b$. The connection is through a resistor network. The resistor network includes resistors 66a, 66b and a rheostat 67 connected in series between the negative side of $e_a$ and the positive side of $e_b$. A null meter 68 is connected from the other interconnected element output terminals to the tap of rheostat 67. The output voltages produce currents $i_a$, $i_b$ as indicated. The tap along rheostat 67 is regulated until currents $i_a$ and $i_b$ are equal. These currents flow in opposite directions through meter 68 to indicate a null balance. The total series resistance $R_a$ traversed by current $i_a$ is made up of resistance 66a plus the resistance looking into the output of thermo-couple $Ta$ and the resistance of that part of rheostat 67 carrying current $i_a$. Similarly, $R_b$ denotes the total series resistance for current $i_b$ which is made up of 66b plus the resistance looking into the output of thermo-couple $Tb$ and the resistance of that part of rheostat 67 carrying current $i_b$. The following equation obtains at a current balance at meter 68:

$$i_a = \frac{e_a}{R_a} = i_b = \frac{e_b}{R_b}$$

$$\therefore \frac{e_b}{e_a} = \frac{R_b}{R_a} \tag{6}$$

It will be noted that both resistors 65a and 65b are fixed and that balance is not obtained by adjusting a resistor in the thermo-couple input circuit, but rather by adjusting variable resistor 67 in the voltage output circuit of both thermo-couples. In this manner, any second order differential inherent in one thermo-couple with respect to the other is accounted for by balancing the pair of thermo-couples the first time they are compared.

Consequently, if we change voltage V at junction 33 and as a result change $I_a$ and $I_b$, element output voltages $e_a$ and $e_b$ change. However, since the current differential circuit as shown in FIG. 3 balances one element against the other by a voltage ratio, any inherent difference in the elements so as to cause one element to have a larger incremental change than the other is accounted for since the ratio of the changes, the second order effect is constant. Consequently, the ratio of the new values of $e_a$ and $e_b$ continues to be equal to the same number, i.e. $R_a/R_b$. To extend the use of FIG. 3 even more, if two completely different thermo-couples are interconnected and even though they have marked differences in component values, once such two thermo-couples are balanced, as indicated by FIG. 3, the ratio of the two output voltages will remain constant. Thus, by using the current differential method, once a balance has been obtained, any change in amplitude of voltage V at junction 33 will not produce a change in the balance condition. In employing the FIG. 3 technique for the system of FIG. 1, 1a wherein thermo-couples of nominally similar composition are employed, a balance by the current differential method provides higher accuracies since second order effects are no longer present in the null sensitive output.

It is intended that all matter contained in the above description or shown in the accompanying drawings shall be interpreted as illustrative and not in a limiting sense.

What is claimed is:

1. Means for providing an accurate D.C. reference supply comprising, a primary standard D.C. source, a first resistor branch including a first resistance of preselected value connected to one end of a rheostat of preselected resistance value, said rheostat having an intermediate tap between its opposed ends, a second resistance branch including second and third resistances of individual and preselected resistance values and also having individual ends forming a common junction, the second end of said rheostat being connected to said last-mentioned junction, the second ends of said first and second resistances forming a common junction connected to one side of said primary standard source, the other side of said source being connected to said rheostat tap, and a regulated D.C. voltage supply connected in parallel across said second resistance branch, said D.C. supply being regulated to provide a preselected voltage potential, the values of said resistances and the position of said tap being selected to define a null current through said primary source upon the establishment of a potential at the second end of said third resistance equal to the preselected potential provided by said regulated supply, whereby said regulated supply provides an accurate reference voltage equal to said preselected potential as long as there is a null current through said standard source.

2. A method for normalizing a first thermal-junction element against a second thermal-junction element with respect to a D.C. reference voltage for the purpose of monitoring an external source, wherein each element is characterized to provide an output voltage which is a function of the R.M.S. value of the input current sensed thereby, the steps comprising, forming two separate resistive branch circuits each including respective resistor means in series with the inputs of individual ones of said elements, connecting both branch circuits across the D.C. reference supply, interconnecting the outputs of the two elements to form a comparison circuit, selecting the resistance values for the aforesaid resistor means to establish equal outputs for the pair of elements as indicated by a balance in the interconnected comparison network, maintaining the outputs of said elements interconnected, disconnecting one branch circuit from the reference supply and connecting the input of the element thereof into a third resistive branch circuit, connecting said third resistive branch to an external source for monitoring such source, adjusting the resistance of said third branch circuit with respect to the resistance of either one of the first and second branch circuits wherein a balance in the interconnected comparison network indicates the value of the monitored source as a predicted proportion of the reference supply.

3. A method for providing an A.C. standard reference comprising the steps of, normalizing the voltage across output terminals of a D.C. voltage supply with respect to a certified D.C. standard to establish a fixed preselected D.C. reference over a range of operating currents, establish two resistive circuits each including the input of a thermo-couple junction element characterized to provide an individual output voltage which is a function of the R.M.S. value of input current sensed thereby, connecting said two circuits to said D.C. reference and selecting relative series resistances for said circuits to balance the outputs of said elements with respect to each other, disconnect one of said balanced elements and connect same into another series resistor circuit, connect said last circuit to an A.C. signal source and regulate the series resistance value of said last circuit in respect to a resistance value of one of said first two circuits to re-establish a balance of the outputs of the thermo-couple elements for a desired level of A.C. source voltage with respect to the level of the D.C. supply.

4. A voltage source for providing an output voltage of a desired magnitude which is equal to the voltage magnitude of a highly accurate battery cell multiplied by a predetermined constant comprising an output circuit for providing a variable output voltage of a magnitude approximately equal to said desired magnitude, means for deriving a voltage whose magnitude is a fixed percentage of the output voltage of said output circuit, and means for comparing said derived voltage with the voltage of said battery cell, said output circuit including means for varying said output voltage to equalize the magnitudes of said battery cell voltage and said derived voltage as determined by said comparing means.

5. A method for comparing the magnitude of a voltage to be monitored to a predetermined voltage magnitude in a circuit having two current-to-voltage transducers and means for comparing the voltages of said two transducers, comprising the steps of:
 (1) connecting said two transducers through respective resistors to a voltage source of said predetermined magnitude,
 (2) adjusting at least one of said resistors to compensate for the different characteristics of said two transducers until said comparing means indicates that said two transducer voltages are equal,
 (3) disconnecting one of said transducers from said voltage source of predetermined magnitude and connecting it through a respective resistor to a terminal the magnitude of whose voltage is to be monitored, and
 (4) determining from said comparing means if said transducer voltages are equal.

6. A method for comparing the magnitude of a voltage to be monitored to a predetermined voltage magnitude in accordance with claim 5 wherein the voltage magnitude to be monitored is different from said predetermined voltage magnitude and the resistor used in step (3) is of a magnitude such that the current through said one transducer will be the same as the current through said one transducer in step (2) if said voltage magnitude to be monitored is of a preselected value.

7. A method for comparing the magnitude of a voltage to be monitored to a predetermined voltage magnitude in accordance with claim 5 wherein the voltage whose magnitude is to be monitored is A.C. and the predetermined voltage is D.C. and the resistor used in step (3) is of a magnitude such that the root means square current through said one transducer is the same as the direct current through said one transducer in step (2) if the root means square magnitude of said A.C. voltage to be monitored is of a preselected value.

8. A voltage monitoring circuit comprising a source of reference potential, first and second thermocouple elements each for producing an output voltage dependent upon the current flowing therethrough, meter means connected to said first and second thermocouple elements for indicating when said respective output voltages are equal, means for connecting each of said first and second thermocouple elements through respective first and second resistors to said source of reference potential, means for adjusting at least one of said first and second resistors to control said meter means to indicate the equality of said two output voltages, and means for disconnecting said first thermocouple element from said source of reference potential and for connecting it to a voltage source to be monitored.

9. A voltage monitoring circuit in accordance with claim 8 wherein said last-mentioned means includes a resistance of a magnitude such that said meter means indicates an equality of the output voltages of said first and second thermocouple elements if the magnitude of said voltage source to be monitored is of a preselected value.

10. A voltage monitoring circuit in accordance with claim 9 wherein said source of reference potential is a D.C. source and said voltage source to be monitored is an A.C. source, said resistor in said last-mentioned means being of a magnitude such that the magnitude of the root means square current through said first thermocouple element when it is connected through said resistor to said A.C. voltage source to be monitored is equal to the D.C. current through said first thermocouple element when it is connected to said D.C. source of reference potential if the magnitude of said A.C. voltage source to be monitored is of a preselected value.

11. A voltage monitoring circuit in accordance with claim 8 wherein each of said first and second thermocouple elements includes positive and negative output terminals, with the output voltage of each of said thermocouple elements appearing across the respective output terminals, and said meter means includes means directly connecting the output terminal of one of said thermocouple elements to the output terminal of the other of said thermocouple elements of opposite polarity, resistance means including an adjustable tap connected between the other output terminals of said first and second thermocouple elements, and a null meter connected between said tap and said directly connecting means.

12. In a monitoring circuit having first and second thermocouple elements, each with positive and negative output terminals, which are calibrated for a reference current and used for comparing said reference current with a current to be monitored, a sensing circuit comprising a resistance having a variable tap connected between the positive output terminal of one of said thermocouple elements and the negative output terminal of the other of said thermocouple elements, and a null meter having two input terminals, one of said input terminals being connected to said variable resistance tap and the other of said input terminals being connected to the negative output terminal of said one thermocouple element and the positive output terminal of said other thermocouple element.

13. A D.C. voltage source comprising a highly accurate battery cell of a predetermined voltage magnitude, one end of said battery cell being connected to a terminal of reference potential, a voltage breakdown device the voltage across which varies slightly in accordance with the magnitude of current flow therethrough, one end of said breakdown device being connected to said terminal of reference potential, a series circuit of a source of current and a variable resistor connected across said breakdown device, a resistance network connected across said breakdown device and provided with a terminal the voltage at which is a fixed fraction of the voltage across said breakdown device, and a meter connected between the other end of said battery cell and said resistance network terminal, the magnitude of said variable resistor being such that said meter is at a null whereby the magnitude of the voltage across said breakdown device is equal to the voltage magnitude of said battery cell multiplied by the inverse of said fixed fraction.

14. A D.C. voltage source in accordance with claim 13 wherein said breakdown device is a zener diode and said series circuit is connected across said zener diode such that current flows through said zener diode in the reverse direction.

15. A voltage source for providing an output voltage of a desired magnitude which is equal to the voltage magnitude of a highly accurate battery cell multiplied by a predetermined constant comprising an output circuit having a breakdown device for providing a variable output voltage of a magnitude approximately equal to said desired magnitude, means for deriving a voltage whose magnitude is a fixed percentage of the output voltage of said output circuit, and means including a meter connected between said voltage deriving means and said battery cell which is at a null when said output voltage is of said desired magnitude for comparing said derived voltage with the voltage of said battery cell, said output circuit including a source of variable current connected to said breakdown device for varying said output voltage to equalize the magnitudes of said battery cell voltage and said derived voltage as determined by said comparing means.

References Cited by the Examiner

UNITED STATES PATENTS

| 1,753,486 | 4/1930 | Travis | 73—359 |
|---|---|---|---|
| 2,169,116 | 8/1939 | Thompson | 324—106 |
| 2,285,211 | 6/1942 | Korman | 321—1.5 X |
| 2,316,153 | 4/1943 | Brown. | |
| 2,512,927 | 6/1950 | Freas | 324—106 |
| 2,696,119 | 12/1954 | Jones | 73—341 X |
| 2,759,150 | 8/1956 | Rosenbaum | 324—98 |
| 2,904,995 | 9/1959 | Obermaier | 73—359 X |
| 2,941,148 | 6/1960 | Catherall | 324—106 |
| 3,102,981 | 9/1963 | Pulliam | 324—98 |
| 3,122,016 | 2/1964 | Fordham | 73—359 X |

JOHN F. COUCH, *Primary Examiner.*

LLOYD McCOLLUM, *Examiner.*

J. M. THOMSON, W. E. RAY, *Assistant Examiners.*